United States Patent
Liu et al.

(10) Patent No.: US 6,246,812 B1
(45) Date of Patent: Jun. 12, 2001

(54) V-GROOVE DUAL FIBER COLLIMATOR FOR DWDM MULTIPLEXOR/DEMULTIPLEXOR

(75) Inventors: Yuqiao Liu, Sunnyvale; Peter C. Chang, Mountain View, both of CA (US)

(73) Assignee: Alliance Fiber Optics Products, Inc., Sunnyvale, CA (US)

( * ) Notice: Subject to any disclaimer, the term of this patent is extended or adjusted under 35 U.S.C. 154(b) by 0 days.

(21) Appl. No.: 09/255,047

(22) Filed: Feb. 22, 1999

(51) Int. Cl.[7] ........................................ G02B 6/32
(52) U.S. Cl. ...................... 385/34; 385/24; 385/65; 385/83; 359/124; 359/131
(58) Field of Search .................... 385/34, 33, 31, 385/65, 24, 83

(56) References Cited

U.S. PATENT DOCUMENTS

| | | | |
|---|---|---|---|
| 5,706,371 | * 1/1998 | Pan | 385/11 |
| 5,796,889 | * 8/1998 | Xu et al. | 385/24 |
| 5,809,193 | * 9/1998 | Takahashi | 385/79 |
| 5,845,023 | * 12/1998 | Lee | 385/33 |
| 6,023,542 | * 2/2000 | Pan et al. | 385/24 |
| 6,118,910 | * 9/2000 | Chang | 385/16 |
| 6,168,319 | * 1/2001 | Francis | 385/79 |

* cited by examiner

Primary Examiner—John D. Lee
Assistant Examiner—Jennifer Doan
(74) Attorney, Agent, or Firm—Wei Te Chung

(57) ABSTRACT

A V-groove dual fiber collimator (1) including an optical lens (10) and a V-groove dual fiber ferrule means (12) fixed with each other. The ferrule means (12) includes a V-groove chip (14) and a cover chip (20) commonly enclosed by a protective guiding sleeve (22) wherein two pigtail fibers (24, 26) are respectively received within the corresponding grooves (16) of the V-groove chip (14). The V-groove ferrule means (12) is itself fixed by adhering its own internal components (14, 20, 22) and the embedded fibers (24, 26), and also fixed to the lens (10).

8 Claims, 1 Drawing Sheet

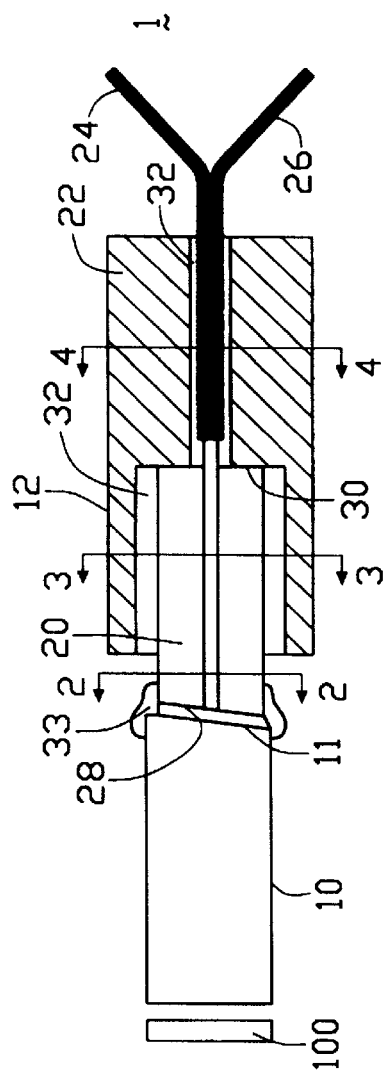
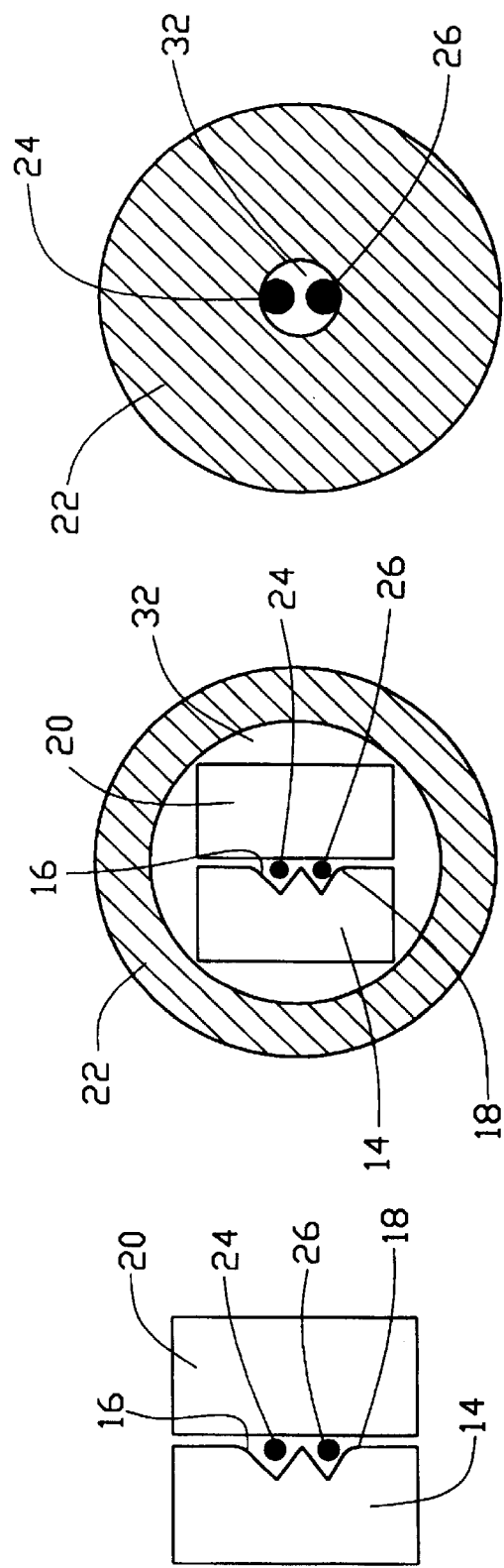

V-GROOVE DUAL FIBER COLLIMATOR FOR DWDM MULTIPLEXOR/DEMULTIPLEXOR

BACKGROUND OF THE INVENTION

1. Field of the Invention

The invention relates to collimators for use with DWDM multiplexor or demultiplexor, and particularly to dual fiber collimators with V-groove positioning devices.

2. The Related Art

As well known, Dense-Wavelength-Divison-Multiplexing (DWDM) multiplexor or demultiplexor generally use the optical filter and the fiber optic collimators. In these applications, a band-pass optical filter is employed to multiplex or demultiplex a desired transmission channel of the in-and-out light of the system according to its center wavelength. An international standard wavelength grid has been suggested by International Telecommunication Union (ITU) for the center wavelengths of the DWDM channels. In the DWDM application, the center wavelength of the DWDM optical filter which does not coincide with the ITU standard wavelength, should be tuned to comply therewith. As the center wavelength of the band-pass optical filter depends upon the incident angle of the light that propagates therein, the center wavelength of the band-pass optical filter can be tuned by such an incident angle. The prior art generally uses an Y-branch structure of the three conventional fiber optic collimators wherein the incident angle is tuned by changing the angles between the collimators and thus the center wavelength of such a multiplexor/demultiplexor is adjustably coincident with the desired ITU wavelength. The disadvantage of such design includes difficulties in reducing its size to achieve a robust and compact structure. The related matters may be referred to U.S. Pat. Nos. 4,464,022, 5,204,771, 5,574,596 and 5,845,023, and "compact Polarization-Independent Optical Circulator", Applied Optics, Vol. 20, No. 15, August 1981, pp. 2683–2687.

Therefore, it is desired to provide a collimator with means which can precisely and efficiently have the filter and the corresponding collimated beam with a required incident angle, thus assuring a desired ITU wavelength can be obtained.

SUMMARY OF THE INVENTION

According to an aspect of the invention, a V-groove dual fiber collimator including an optical lens and a V-groove dual fiber ferrule means fixed with each other. The ferrule means includes a V-groove chip and a cover chip commonly enclosed by a protective guiding sleeve wherein two pigtail fibers are respectively received within the corresponding grooves of the V-groove chip. The V-groove ferrule means is itself fixed by adhering its own internal components and the corresponding embedded fibers, and also fixed to the lens by adhesive.

BRIEF DESCRIPTION OF THE DRAWINGS

FIG. 1 is a cross-sectional view of a collimator according to the invention.

FIG. 2 is a cross-sectional view of the collimator of FIG. 1 along line 2—2.

FIG. 3 is a cross-sectional view of the collimator of FIG. 1 along line 3—3.

FIG. 4 is a cross-sectional view of the collimator of FIG. 1 along line 4—4.

DETAILED DESCRIPTION OF THE PREFERRED EMBODIMENTS

References will now be in detail to the preferred embodiments of the invention. While the present invention has been described in with reference to the specific embodiments, the description is illustrative of the invention and is not to be construed as limiting the invention. Various modifications to the present invention can be made to the preferred embodiments by those skilled in the art without departing from the true spirit and scope of the invention as defined by appended claims.

It will be noted here that for a better understanding, most of like components are designated by like reference numerals throughout the various figures in the embodiments. Attention is directed to FIGS. 1–4 wherein a V-groove dual fiber collimator 1 is provided for use within a DWDM multiplexor/demultiplexor using optical filters. For example, in a demultiplexor application, the light coupled therein from the input pigtail fiber of the dual fiber collimator will be collimated and transmitted to a DWDM optical band-pass filter. The part of the in-pass-band light will pass through the filter as a demultiplexed channel and may be coupled into another collimator or launched to an optical power detector. The part of the out-pass-banc light is coupled back into another pigtail fiber of the dual fiber collimator and transmitted to the next stage for demultiplexing other channels.

The collimator 1 includes an optical lens 10 and a V-groove dual fiber ferrule means 12. The V-groove ferrule means 12 comprises a V-groove chip 14 defining a pair of V-shaped grooves 16 along its upper face 18 and a cover chip 20 positioned on the upper face 18 of the V-groove chip 14, commonly enclosed by a protective guiding sleeve 22. A first optic fiber 24 and a second optical fiber 26 are respectively received within the corresponding V-shaped grooves 16 of the V-groove chip 14 and generally sandwiched between the V-groove chip 14 and the cover chip 20 wherein the front end of the fibers 24, 26 are polished and terminated around the front end surface 28 of the ferrule means 12 and the rear end of the fibers 24, 26 extend out of the rear surface 30 of the V-groove chip 14 through the guiding sleeve 22 to an exterior.

It should be noted that the V-groove chip 14, the cover chip 20 and the guiding sleeve 22 and the corresponding embedded fibers 24, 26 may be fixed with each other by adhesive 32. Afterwards, the front end surface 28 of the ferrule means 12 is ground and polished with an angle relative to the axis of the V-groove ferrule means 12 and an anti-reflection coating is then applied thereunto for reducing the back reflection in the pigtail fibers 24, 26. Similarly, the optical lens 10 has a corresponding end surface 11, opposite to said end surface 28 of the ferrule means 12, angled relative to the axis of the optical lens for the same purpose. The ferrule means 12 can be fixed with the lens 10 by the adhesive 33 around its front end, or by an alignment sleeve enclosing both the ferrule means 12 and the lens 10 therein.

It can be understood that the filter device 100 is positioned at the other end of the lens 10 opposite to the ferrule means 12. Therefore, the space/distance between the fibers 24, 26 in the ferrule means 12 results in a crossing angle between the two collimated in-and-out light beams of the dual fiber collimator 1 through the lens 10. The beam-crossing angle varies in accordance with both the space between the fibers 24, 26 and the focal length of the optical lens 10. Because the focal length of the optical lens is the inherent character of the optical lens which is selectively used in the collimator 1, then difficulties in controlling the beam-crossing angle of two light beams is concerned about how to obtain the required distance/space between the corresponding two fibers 24, 26. The invention provide a series of V-groove chips 14 with different distances between the spaced parallel V-shaped grooves 18, respectively. Therefore, by properly selecting the correct corresponding V-groove chip 14 with the required space between the two parallel V-shaped grooves 18 therein, the collimator 1 may be easily manufactured. Then, by means that the filter 100 is properly aligned to this collimator 1 at the place where the collimated beams cross, the center wavelength of the demultiplexor could be made to coincide with the predetermined desired ITU wavelength.

It is also noted the distance between the angled end surfaces 11, 28 of the optical lens 10 and the ferrule means 12 is adjusted and the lens 10 and the ferrule means 12 is fixed with each other by adhesive 33 or by an alignment sleeve enclosing both the ferrule means 12 and the lens 10 therein, so that the waists of the two light beams which are collimated into and out of said collimator 1 may coincide with each other around the place the filter 100 is positioned.

The feature of the invention includes using a chip 14 with a pair of parallel V-shaped grooves with a specific distance therebetween and installing the two separate optical fibers 24, 26 therein to not only easily and quickly, but also efficiently obtain the desired space between these two fibers 24, 26. The two V-shaped grooves 16 are configured to precisely define the distance between the two fibers 24, 26 respectively received therein, wherein the depth of the groove 16 may be configured to have the embedded fibers 24, 26 slightly protrude out of the top surface of the chip 14, thus allowing the cover chip 20 may directly confront the fibers 24, 26 and cooperate with the chip 14 to efficiently retainably sandwich the fibers 24, 26 therebetween. The cover chip 20, the guiding 22 sleeve and the adhesive 32 also further provide securement of these two spaced fibers 24, 26 within the collimator 1.

The invention also discloses provision of a series of V-groove chips 14 respectively having different distances between the corresponding two parallel grooves 16 for forming the different collimators 1, of which each may tune the angle of the light beam incident on a DWDM optical band-pass filter in a DWDM multiplexor or demultiplexor using the dual fiber collimator technique, thus having the different center wavelength of the optical band-pass filter coincide with that of the ITU grid for the DWDM application. This multiple provision have a corresponding series of different incident angles realized to tune the center wavelength of a DWDM ban-pass filter to a desired ITU grid wavelength.

In comparison with the aforementioned prior art, the invention has a more compact and robust structure. It is also noted that the protective guiding sleeve 22 is used to provide a guide and protection to the fibers 24, 26 extending out of the V-grooves 16 for easy handling and reliable performance.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claims.

Therefore, person of ordinary skill in this field are to understand that all such equivalent structures are to be included within the scope of the following claims.

We claim:

1. A dual fiber collimator comprising:

an optical lens; and a ferrule means coaxially aligned with said lens and defining a pair of laterally spaced V-shaped grooves with a specific distance therebetween in a lateral direction; and a pair of optical fibers retainably received within the corresponding V-shaped grooves, respectively, so that the collimator may be properly spatially aligned with a filter positioned beside the optical lens opposite to the ferrule and make a center wavelength of the filter to coincide with a standard one.

2. The dual fiber collimator as described in claim 1, wherein the ferrule means includes a first chip in which said grooves are formed around an upper surface thereof, a second chip covering said first chip and sandwiching the fibers therebetween.

3. The dual fiber collimator as described in claim 2, wherein a protective guiding sleeve surrounds the fist and second chips.

4. The dual fiber collimator as described in claim 3, wherein adhesive is applied to the ferrule means.

5. A method for making a dual fiber collimator, comprising steps of:

providing an optical lens;

providing a ferrule means defining a pair of laterally V-shaped grooves therein;

installing a pair of optical fibers into the ferrule means by receipt within the corresponding grooves, respectively;

providing angles with end surfaces of the ferrule means; and fixing the optical lens and the ferrule means together.

6. The method as described in claim 5, further comprising a steps of providing the ferrule means with a first chip in which the grooves are formed, and a second chip covering said first chip for retainably holding the fibers therebetween.

7. The method as described in claim 6, wherein a protective guiding sleeve encloses both the first and second chips.

8. A method for making a dual fiber collimator, comprising steps of:

providing an optical lens;

providing a series of V-groove chips, each defining a pair of spaced grooves with a space therebetween, said chips having different spaces thereamong;

selecting one of said chip by referring to a focal length of said optical lens so as to provide a desired incident angle of a light beam when said light beam passes through a filter; and fixing the optical lens and the selected chip so that the desired incident angle of the light beam collimated by the collimator, results in a center wavelength of the filter being coincident with a standard one.

* * * * *